United States Patent [19]

Radziwill et al.

[11] Patent Number: 4,752,724
[45] Date of Patent: Jun. 21, 1988

[54] COMMUTATION CIRCUIT FOR A COLLECTORLESS D.C. MOTOR

[75] Inventors: Wolfgang M. J. Radziwill, Aachen; Günter Döring, Würselen, both of Fed. Rep. of Germany

[73] Assignee: U.S. Philips Corporation, New York, N.Y.

[21] Appl. No.: 6,515

[22] Filed: Jan. 23, 1987

[30] Foreign Application Priority Data

Jan. 25, 1986 [DE] Fed. Rep. of Germany ....... 3602227

[51] Int. Cl.[4] ............................................. H02P 6/02
[52] U.S. Cl. .................................... 318/254; 318/138
[58] Field of Search .................... 318/138, 254, 439

[56] References Cited

U.S. PATENT DOCUMENTS

| | | | |
|---|---|---|---|
| 3,906,320 | 9/1975 | Doemen | 318/138 X |
| 3,916,273 | 10/1975 | Grünleitner et al. | 318/138 |
| 3,942,083 | 3/1976 | Takahashi et al. | 318/138 |
| 4,238,717 | 12/1980 | Knight et al. | 318/254 X |
| 4,558,264 | 12/1985 | Weischedel | 318/254 |
| 4,641,066 | 2/1987 | Nagata et al. | 318/138 X |
| 4,654,566 | 3/1987 | Erdman | 318/138 X |

Primary Examiner—Bentsu Ro
Attorney, Agent, or Firm—David R. Treacy; Bernard Franzblau

[57] ABSTRACT

A control circuit for a collectorless d.c. motor, without a commutation sensor, and comprising a stator with a multiphase system and a permanent-magnet rotor. The commutation state of the motor depends on the voltages induced in the stator windings. A comparison signal is generated which indicates whether the sign of that winding voltage which is not connected to a direct current source by means of the circuit electronic switching elements is in conformity with a predetermined sign which depends on the instantaneous commutation state. This comparison signal is inhibited during those time intervals in which transient effects which may cause spurious zero crossings occur in the windings as a result of the electronic switching elements being turned off. The switching elements are always switched one commutation step further if the comparison signal does not have the appropriate sign.

16 Claims, 9 Drawing Sheets

COMMUTATION CIRCUIT FOR A COLLECTORLESS D.C. MOTOR

This invention relates to a control circuit for a collectorless d.c. motor without a commutation sensor and comprising a permanent-magnet rotor having an arbitrary number of pole pairs, a stator and at least two windings forming a multiphase system, of which each phase, depending on the voltages induced in the windings by the permanent-magnet field of the rotor, can be connected to the negative and/or the positive pole of a direct current source by electronic switching elements to perform commutation steps in accordance with the commutation state.

In electronically commutated d.c. motors it is necessary to determine the instantaneous rotor position in order to ensure a correct commutation. Normally this is effected by means of sensors (photodiodes, Hall generators etc.). In order to avoid the incorporation of such elements in the motor, which is uneconomic and demands space, it is known to measure the voltages induced in the armature windings at each of the currentless instants and to derive signals corresponding to the instantaneous rotor position from these voltages in order to effect commutation. However, the magnitude of the induced voltages depends on the motor specifications and, in addition, on the motor speed. As a result, the rotor position can thus be determined only above a specific minimum speed, below which a correct commutation is no longer guaranteed. This applies in particular to the stationary condition of the motor, so that a correct starting of the motor is not guaranteed and a special starting circuit is required.

DE-AS 2604638 describes a control circuit for a collectorless d.c. motor which employs the pattern of the signs of the voltages induced in the three phases in relation to a reference voltage for the purpose of commutation. However, this means that at any arbitrary instant at least one of the phases must be currentless. The common reference potential required for the level measurement makes this control circuit only suitable for motors arranged in star with an external star point. In addition, this circuit requires the use of a special starting logic.

SUMMARY OF THE INVENTION

It is an object of the invention to provide a commutation circuit for a collectorless d.c. motor which operates without sensors, which, if it comprises an at least two-phase stator winding and a permanent-magnet rotor and is of an otherwise arbitrary construction, operates correctly in all speed ranges, and which also guarantees a correct starting.

According to the invention this object is achieved in that a comparison signal is generated, which signal indicates whether the sign of that winding voltage which is not applied to the direct current source by means of the electronic switching elements corresponds to a given sign which depends on the instantaneous commutation state, the comparison signal is inhibited in those intervals in which transient effects occur in the windings as a result of turn-off of the electronic switching elements, and which may cause spurious zero crossings, the switching elements are switched one commutation step further if the comparison signal does not indicate a corresponding sign.

The control circuit first compares the voltage of the winding which is not connected to the directcurrent source and in which voltages are induced with a predetermined sign which depends on the prevailing commutation state. The resulting comparison signal is inhibited in those time intervals in which transient effects, which may cause parasitic zero crossings, can occur as a result of the current source being turned off. At other times the comparison voltage is evaluated and depending on this evaluation the commutation advanced one step.

Erroneous commutations are thus precluded because possible parasitic zero crossings are inhibited. A further advantage is that the circuit can operate reliably over a larger range of speeds because the aboslute magnitude of the voltages induced in the winding does not play a part, only the sign of the induced voltages being considered. The circuit does not require the use of any sensors or similar elements.

In a further embodiment a measurement voltage is computed by substration of an externally available or computed star-point voltage from a signal which comprises those intervals of the winding voltages in which the windings are not connected to the direct current source by means of the electronic switching elements, a nominal-phase signal is generated which defines the appropriate sign of the measurement voltage for the instantaneous commutation state of the motor, a comparison signal is generated which indicates whether the sign of the measurement voltage and the sign defined by the nominal-phase signal are the same, the comparison signal is inhibited for a given length of time during those intervals in which transient effects which may give rise to spurious zero crossings can occur in the windings as a result of the electronic switching elements being turned off, the electronic switching elements are advanced one commutation step in response to the comparison signal in the case of different signs of the measurement voltage and the nominal sign defined by the nominal-phase signal.

This control circuit is responsive to a comparison of the sign of the measurement voltage with a nominal sign only when there are no transient effects in the windings which may cause parasitic zero crossings, and depending on this comparison of signs it switches the electronic switching elements one commutation step further. This means that after every commutation the induced voltage is not evaluated immediately but only after a delay which is selected so as to eliminate the influence of all transient effects which may give rise to subsequent parasitic zero crossings. After this delay time the commutation advances one step when the sign of the measurement voltage changes. Subsequently, as a result of this commutation, the nominal-phase signal will indicate another nominal sign. This is compared with the sign of the measurement voltage after the measurement voltage has been inhibited again for a predetermined time interval in order to eliminate the influence of transient effects with parasitic zero crossings. After this inhibition interval the sign indicated by the nominal-phase signal is again compared with the measurement voltage. In the case of a corrrect commutation these signs remain the same until the sign of the measurement voltage changes, after which the commutation again advances one step.

In this way the control circuit operates very reliably because the influence of transient effects, which may give rise to parasitic zero crossings, is eliminated in a reliable manner and thus cannot cause erroneous commutations. Moreover, the circuit operates reliably over a wide range of speeds because the absolute magnitude of the induced voltages is irrelevant, only their signs being utilized for the purpose of commutation. As the control circuit does not directly employ the voltages induced in the two or more phases, but employs the measurement voltage derived therefrom for determining the rotor position, motors in star arrangement need not have a star point external to the motor. Moreover, the circuit may also be used in conjuction with motors in delta arrangement. It is obvious that the relevant motors may operate with an externally available star voltage, so that this voltage need not be computed in the circuit.

In a further embodiment of the invention the electronic switching elements are switched one additional commutation step further if the switching elements have not been advanced by the comparison signal for a predetermined time interval.

When the motor is started or after the rotor has been stalled the induced voltages and hence the measurement voltage will be zero. As a consequence, the sign of the measurement voltage does not change, so that the rotor position cannot be determined and the motor cannot be commutated correctly, as a result of which the rotor is not set into rotation. For this reason the commutation is automatically advanced one step when the motor has not made a commutation step for a predetermined time interval, which is an indication that the rotor either rotates too slowly or is stationary. After this commutation step the control circuit proceeds normally, i.e. after the inhibition interval the sign of the measurement voltage is compared with the nominal sign and in the case of an incorrect rotation, i.e. if the two signals have different signs, the commutation advances one step. In this way the appropriate commutation state for the instantaneous rotor position is obtained rapidly so that subsequently the motor can accelerate. Thus, the correct commutation state after starting of the motor is also obtained when the rotor has been stalled.

In accordance with a further embodiment of the invention the states of the electronic switching elements and the nominal-phase signal are determined by binary combinations of the output signals of a shift register which cycles through six positions and which is advanced by means of a shift signal which is generated either by the comparison signal or each time that the switching elements have not been actuated by the comparison signal for a predetermined time interval.

The commutation state of the motor follows from the position of the shift register which cycles through six states. By means of binary logic operations the outputs of the shift register provide the signals for the switching elements and the nominal-phase signal which indicates the correct sign of the measurement voltage. The shift register is advanced by means of the shift signal. If this shift signals fails to appear for a predetermined time interval, the shift register is also advanced one position. Thus, both the control signals for the switching elements and control signals for deriving the fictitious star voltage and determining the rotor position can be obtained by means of shift registers and binary logic operations.

In a further embodiment of the invention the measurement voltage is determined by means of an analog multiplexer and an analog computing circuit.

If the star voltage is not available externally of the motor it must be computed. The measurement voltage is derived by means of an analog multiplexer and an analog computing circuit. In the case of, for example, a motor having three windings the analog multiplexer always combines those sub-intervals of the three-phase voltages in which transient effects and subsequently induced voltages occur. The analog multiplexer may be controlled, for example, by signals obtained by performing binary logic operations on the outputs of the shift register.

In a further embodiment of the invention the comparison signal is inhibited during those time intervals in which the measurement voltage exceeds a predetermined positive voltagre or decreases below a predetermined negative voltage.

Due to the fact that in the intervals in which transient effects occur in the windings the comparison signal provides incorrect information, the comparison signal is suppressed during these intervals. For this purpose it is constantly ascertained whether the measurement voltage decreases below a predetermined lower negative voltage or exceeds a predetermined positive voltage. If this is the case, transient effects occur in one of the phases and the sign of the measurement voltage gives incorrect results. For this reason the comparison signal is suppressed during these intervals, i.e. the comparison of the sign of the measurement voltage and the sign given by the nominal-phase signal is then ignored.

In a further embodiment of the invention, in order to eliminate the influence of spurious zero crossings, the comparison signal is inhibited additionally for a predetermined time interval after every switching operation of the electronic switching elements and for a predetermined time interval after every transient effect.

In order to ensure that spurious zero crossings of the measurement voltage, which may occur before and after the transient effects, do not lead to an undesired commutation, the comparison signal is inhibited, i.e. is ignored, not only during the transient effects but also for predetermined time intervals before and after the transient effects.

In a further embodiment of the invention, during the generation of the comparison signal the sign of the measurement voltage is determined depending on whether the measurement voltage exceeds or decreases below a small predetermined voltage whose sign is opposite to the sign of the measurement voltage, as indicated by the nominal-phase signal.

In a further embodiment of the invention the length of the predetermined time interval during which the comparison signal is inhibited after every transient effect depends on the duration of the transient effect. This may be necessary if the transient current does not decay rapidly enough (for example, in the case of motors with high eddy-current losses).

As the measurement voltage is very small in the case of low speeds and is zero when the motor is stationary, a comparison circuit which compares the sign of the measurement voltage and the sign given by the nominal-phase signal may assume a random state or begin to oscillate. For this reason the sign of the measurement voltage is determined in accordance with the criterion whether the measurement voltage exceeds or decreases below a small predetermined voltage. Depending on the nominal-phase signal the sign of this last-mentioned voltage is changed in such a way that if the nominl-phase signal indicates a positive nominal sign the comparison voltage is negative and in the case of a negative nominal sign the comparison voltage is positive. This ensures that the measurment voltage always has a well defined sign when the induced voltages are very small and when the motor is stationary, so that the subsequent parts of the circuit cannot begin to oscillate.

BRIEF DESCRIPTION OF THE DRAWINGS

An embodiment of the invention will now be described in more detail, by way of example, with reference to the accompanying drawings. In the drawings

DESCRIPTION OF THE PREFERRED EMBODIMENTS

Figure 1:
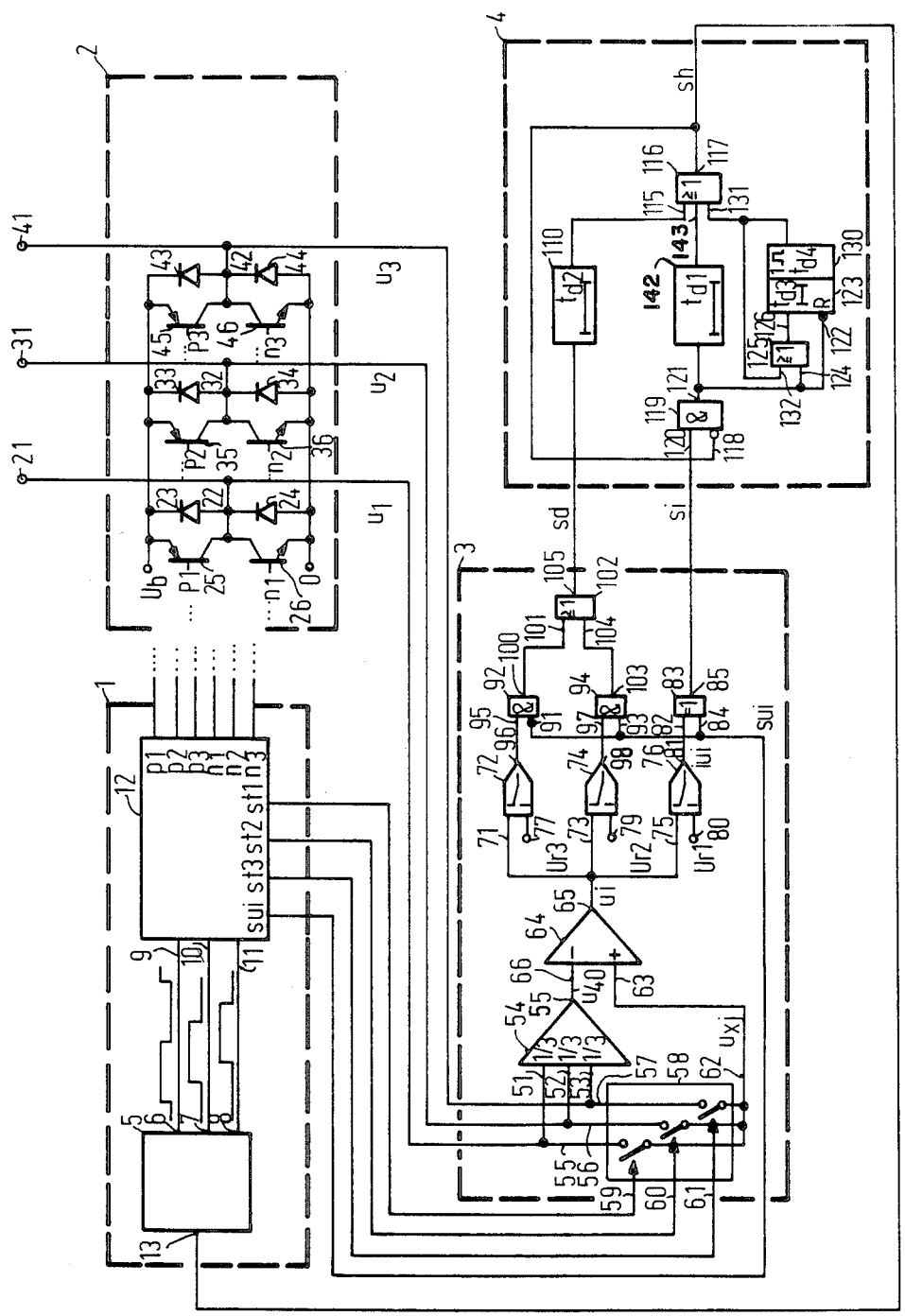
FIG. 1 is the block diagram of a control circuit for a three phase system.

FIG. 1 shows the block diagram of a control circuit for a collectorless d.c. motor with three stator windings forming a three-phase system. The control circuit comprises four circuit sections, namely the signal-shaping circuit 1, the power circuit 2, the position-measurement circuit 3, and the delay circuit 4. The signal-shaping circuit 1 comprises a shift register 5 having outputs 6, 7 and 8 connected to inputs 9, 10 and 11 of a logic circuit 12. The shift register 5 is advanced by means of a shift signal sh applied to the input 13 of the shift register 5. By means of binary logic operations the logic circuit 12 generates switching signals p1, p2, p3, n1, n2 and n3 for the switching elements and a nominal-phase signal sui and three control signals st1, st2 st3 for the position-measurement circuit.

The power circuit 2 connects the three phase-windings of the stator to the positive or to the negative pole of the current source depending on the commutation state defined by the control signals p1 to n3. A terminal 21 of a first winding of the motor is connected to a junction point 22. A first diode 23 is connected between this junction point 22 and the positive pole and a second diode 24 is connected between said junction point and the negative pole of the current source. The anode of the diode 23 is connected to the junction point 22 and the cathode of the diode 24 is connected to this junction point 22. The switching signal p1 is applied to the base of a pnp transistor 25. The transistor 25 has its collector connected to the junction point 22 and its emitter to the positive pole of the current source. The switching signal n1 is applied to the base of an npn transistor 26. This transistor 26 has its emitter connected to the negative pole of the current source and its collector to the junction point 22. This circuit ensures that the winding terminal is connected to the positive pole of the current source in the case of a low level of the switching signal p1 and to the negative pole in the case of a high level of the switching signal n1. By means of the two diodes 23 and 24 excess voltages caused by turn-off transients of the two transistors are drained respectively to the positive pole and the negative pole of the current source.

A terminal 31 of a second stator winding is connected to a junction point 32. In the same way as for the first winding, this junction point is connected to the positive pole of the current source via a diode 33 and a pnp transistor 35 which is switched by the switching signal p2 and to the negative pole of the current source via a diode 34 and an npn transistor 36, whose base receives the switching signal n2. In the same way as for the two other winding terminals, a terminal 41 of a third stator winding is connected to the current source by means of diodes 43 and 44 and transistors 45 and 46. The base of the pnp transistor 45 receives the switching signal p3 and the base of the npn transistor 46 receives the switching signal n3. The power circuit 2 thus connects the terminal 21 of the first winding to the positive pole of the current source in the case of a low level of the switching signal p1, the terminal 31 of the second winding in the case of a low level of the switching signal p2, and the terminal 41 of the third winding in the case of a low level of the switching signal p3. In a similar way the windings are connected to the negative pole of the current source in the case of a high level of the switching signals n1, n2 or n3.

The terminals 21, 31 and 41, carrying the three winding voltages u1, u2 and u3, are further connected to inputs 51, 52 and 53 of an analog computing circuit 54 and to inputs 55, 56 and 57 of an analog multiplexer 58 in the position-measurement circuit 3. Three further inputs 59, 60 and 61 of the analog multiplexer 58 receive control signals st1, st2 and st3 from the logic circuit 12 of the signal-shaping circuit 1. When the control signal st1 is active the signal u1 on the input 55 of the analog multiplexer 58 is transferred to the output 62 of the analog multiplexer 58. The control signal st2 transfers the signal u2 from the terminal 31 to the output 62 of the analog multiplexer 58 via the input 56 of the analog multiplexer 58. The same applies to the control signal st3 and the signal u3 on the terminal 41. The signal on the output 62 of the analog multiplexer 58 is designated $u_{xj}$ and comprises the sub-intervals of the voltages u1, u2 and u3 in which transient effects and subsequently induced voltages occur. This signal $u_{xj}$ is applied to a positive input 63 of an operational amplifier. The analog computing circuit 54 multiplies each of the three input signals u1, u2 and u3 applied via the inputs 51, 52 and 53 by a factor of $\frac{1}{3}$ and adds the signals to each other. The output 55 of this analog computing circuit 54 applies the signal $u_{40}$ to the negative input 66 of the operational amplifier 64. The operational amplifier 64 comprises an output 65 carrying a signal $u_i$. This signal $u_i$ is the computed measurement voltage. The signal $u_i$ is applied to a first input 71 of a first comparator 72, to a first input 73 of a second comparator 74, and to a first input 75 of a third comparator 76. The second input 77 of the first comparator 72 receives a positive reference voltage $U_{r3}$ and the second input 79 of the second comparator 74 receives a negative reference voltage $U_{r2}$. These two reference voltages $U_{r2}$ and $U_{r3}$ are selected in such a way that the measurement voltage exceeds or becomes smaller than said reference voltages only when transient effects occur. A small non-zero reference voltage $U_{r1}$ is applied to a second input 80 of the third comparator 76. The output 81 of the third comparator 76 carries the signal iui which indicates whether the computed measurement voltage exceeds or is smaller than the reference voltage $U_{r1}$. This signal iui is applied to a first input 82 of an EXCLUSIVE-OR logic gate 83. The nominal-phase signal sui from the signal-shaping circuit 1 is applied to a second input 84 of the gate 83. The signal si appears on the output 85 of the gate 83. This comparison signal si indicates whether the nominal-sign signal sui and the signal iui derived by comparison between the reference voltage $U_{r1}$ and the measurement voltage have the same sign. The signal si is high if the signals sui and iui have different signs and it is low in all the other cases. The nominal-sign signal sui is further applied to an inverting first input 91 of a first AND gate 92 and to a first input 93 of a second AND gate 94. A first input 95 of the first AND gate 92 is connected to an output 96 of the first comparator 72 and a second input 97 of the second AND gate 94 is connected to an output 98 of the second comparator 74. An output 100 of the first AND gate 92 is connected to a first input 101 of an OR gate 102 and an output 103 of the second AND gate 94 is connected to a second input 104 of the OR gate 102. The output 105 of the AND gate 102 carries the signal sd. This signal sd is high if the fictitious star voltage ui either lies below the negative reference voltage $U_{r2}$ or exceeds the positive reference voltage $U_{r3}$.

After every high-low edge of the signal sd a first delay element 110 in the delay circuit 4 generates a pulse having a width $t_{d2}$. The output signals of the delay element are applied to a first input 115 of an OR gate 116. An output 117 of the OR gate 116 carries the shift signal sh. This shift signal sh is applied to the input 13 of the shift register 5 of the signal shaping circuit 1 and to an inverting input 118 of an AND gate 119 in the delay circuit 4. A second input 120 of the AND gate 119 is connected to the output 85 of the EXCLUSIVE-OR gate 83 of the position-measurement circuit 3 and carries the signal si. An output 121 of the AND gate 119 is connected to a second delay element 142, which generates a pulse of the width $t_{d1}$ after every low-high edge on its input. The output signal of this delay element 142 is applied to a second input 143 of the OR gate 116. Further, the output 121 of the AND gate 119 is connected to the rest input 122 of a delay element 123 and to a first input 124 of an OR gate 125. An output 126 of the OR gate 125 is connected to the signal input of the delay element 123 which delays this input signal by a predetermined time interval $t_{d3}$. This delay element 123 is followed by a pulse shaper 130 which generates a pulse of a length $t_{d4}$ upon every high-low edge in the output signal of the delay element 123. This signal is applied to a third input 131 of the OR gate 116 and to a second input 132 of the OR gate 125.

The output 117 of the OR gate 116, which carries the shift signal sh, consequently supplies an output pulse if:

1. the signal sd reaches the input 115 of the OR gate 116 via the delay element 110, 2. the signal obtained by ANDing the signal si and the fed-back inverted shift signal sh reaches the second input 143 of the OR gate 116, or 3. during the time interval $t_{d3}$ no signal has appeared on the output 121 of the AND gate 119 and the pulse shaper $t_{d4}$ consequently generates a pulse which is applied to the third input 131 of the OR gate 116.

Figure 2:
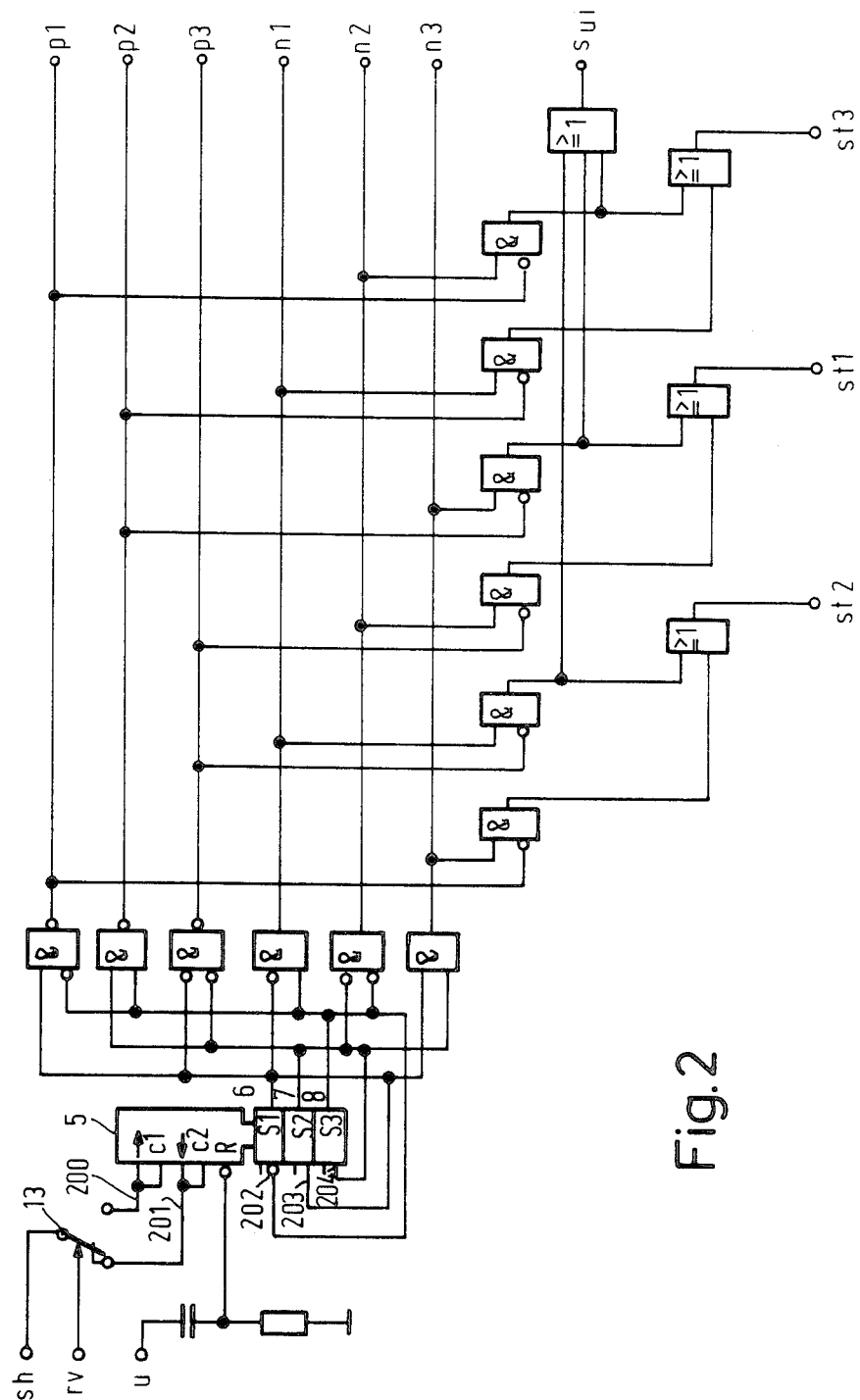
FIG. 2 is the circuit diagram of the signal-shaping circuit in the control circuit of FIG. 1.

FIG. 2 is a circuit diagram of the signal-shaping circuit 1. Depending on a signal rv the shift sh is applied either to a first shift input 200 of the shift register 5 or to a second shift input 201 of the shift register 5 via an input 13 of the circuit. If the signal sh is applied to the first input the shift register shifts forwards and in all the other cases it shifts backwards. Thus, the signal rv enables the shifting direction of the shift register to be selected and hence the commutation cycle and the direction of rotation of the motor. The three outputs 6, 7 and 8 of the shift register 5 are connected to inputs 202, 203 and 204 of the shift register. The output 6 is connected to the input 203, the output 7 to the input 204, and the output 8 to the input 202. After a shift in the positive direction the input signal from the input 202 appears on the output 6, the input signal from the input 203 appears on the output 7, and the input signal from the input 204 appears on the output 8 of the shift register 5. The switching signals $p_1, p_2, p_3, n_1, n_2, n_3$ for the switching elements are derived from the output signals 6, 7 and 8 of the shift register 5 by means of logic circuits, namely inverters and AND gates. The output 6 of the shift register 5 carries the signal S1, the output 7 carries the signal S2, and the output 8 carries the signal S3. The signals $p_1$ to $n_3$ are obtained by the following logic combinations of the signals S1, S2 and S3:

TABLE 1

| Signal | logic operation |
|---|---|
| p1 | $S1 \cap \overline{S3}$ |
| p2 | $\overline{S2} \cap S3$ |
| p3 | $\overline{S1} \cap \overline{S2}$ |
| n1 | $\overline{S1} \cap S3$ |
| n2 | $\overline{S2} \cap \overline{S3}$ |
| n3 | $S1 \cap S2$ |

In the same way as the nominal-sign signal sui the control signals st1, st2 and st3 are derived from the control signals, $p_1, p_2, p_3, n_1, n_2$ and $n_3$ by means of inverters, AND gates and OR gates. The logic combinations of the signals are as follows:

TABLE 2

| Signal | logic operation |
|---|---|
| st1 | $(p3 \cap n2) \cup (\overline{p2} \cap n3)$ |
| st2 | $(\overline{p1} \cap n3) \cup (\overline{p3} \cap n1)$ |
| st3 | $(\overline{p2} \cap n1) \cup (\overline{p1} \cap n2)$ |
| sui | $(\overline{p3} \cap n1) \cup (\overline{p2} \cap n3) \cup (\overline{p1} \cap n2)$ |

Figure 3:
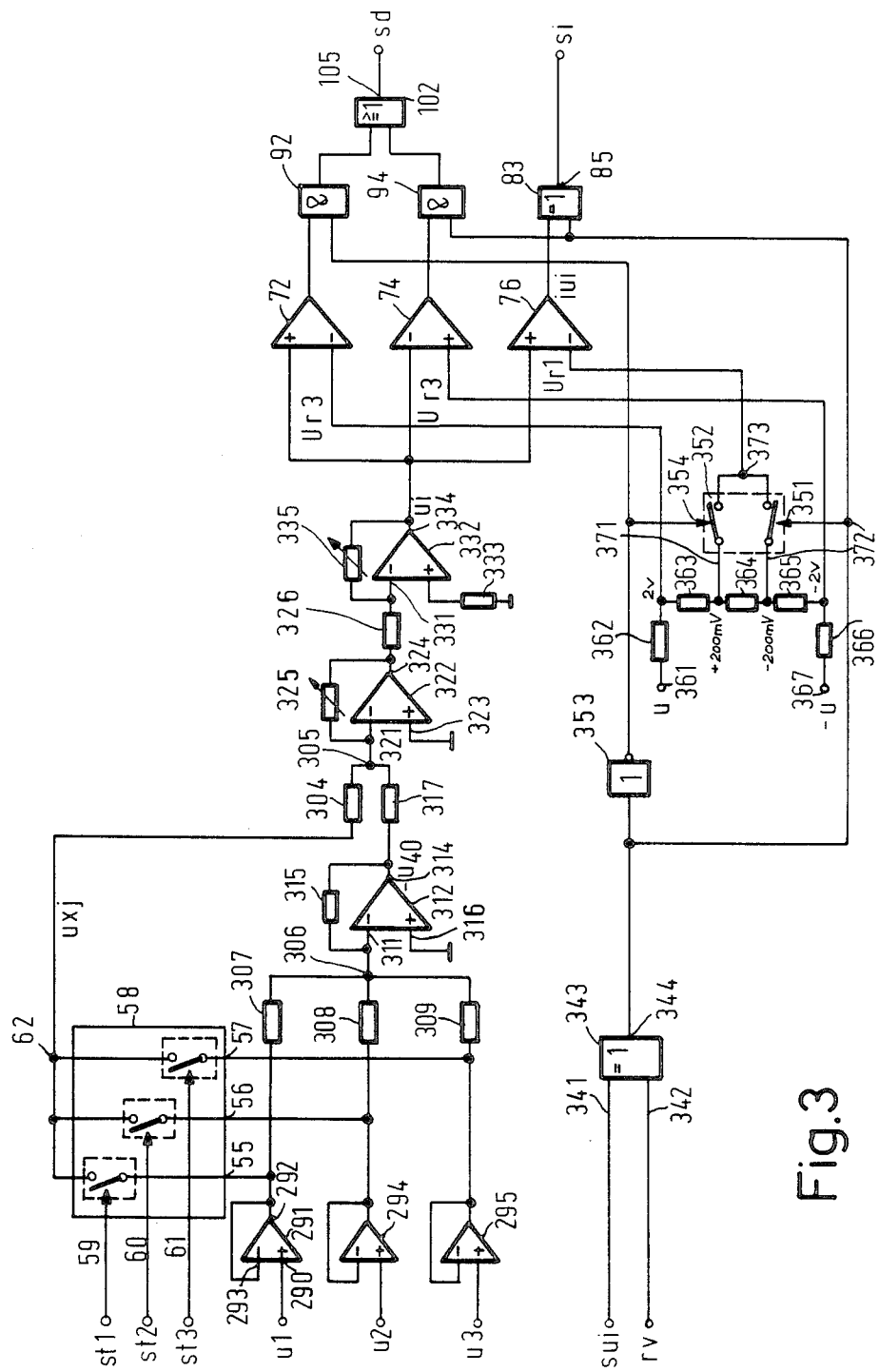
FIG. 3 is the circuit diagram of the position measurement circuit in the control circuit of FIG. 1.

FIG. 3 is the circuit diagram of the position-measurement circuit 3. The control signals st1, st2 and st3 from the logic circuit 12 in the signal shaping circuit 1 are applied to the inputs 59, 60 and 61 of the analog multiplexer 58. The signal $u_1$ is applied to a positive input 290 of an operational amplifier 291 whose output 292 is connected to the negative input 293. The output 292 of the operational amplifier 291 is further connected to the input 55 of the analog multiplexer. Similarly, the signal $u_2$ is applied to the input 56 via an operational amplifier 294 and the signal $u_3$ is applied to the input 57 of the analog multiplexer 58 via an operational amplifier 295. The analog multiplexer 58 is operated in such a way that the signal on the input 55 is transferred to its output 62 if the signal st1 is high. The same applies to the input 56 and the signal st2 and to the input 57 and the signal st3. In the case of suitably selected control signals st1, st2 and st3 the output signal 62 comprises those sub-intervals of the winding voltages $u_1$, $u_2$ and $u_3$ in which transients effects and subsequently induced voltages occur. The signal on the output 62 of the analog multiplexer 58 is designated $u_{xj}$ and is applied to a junction point 305 via a resistor 304. By means of a resistor 307 a further junction point 306 is connected to the output 292 of the operational amplifier 291. Similarly, the operational amplifier 294 is connected to the junction point 306 via a resistor 308 and the operational amplifier 295 is connected to the junction point 306 via a resistor 309. The resistors 307, 308 and 309 must have equal resistance values in order to ensure that the voltages $u_1$, $u_2$ and $u_3$ each appear on the junction point 306 multiplied by a factor of 1/3. The junction point 306 is connected to the negative input 311 of an operational amplifier 312 whose output 314 is fed back to the negative input 311 of the operational amplifier 312 via a resistor 315. A positive input 316 of the operational amplifier 312 is connected to ground. The output 314 of the operational amplifier 312 supplies the signal $-u_{40}$, which is fed to the junction point 305 via a resistor 317. The resistors 304 and 317 must have equal resistance values in order to ensure that the signals $u_{xj}$ and $-u_{40}$ appear on the junction point 305 in equal proportion. The junction point 305 is connected to a negative input 321 of an operational amplifier 322, whose positive input 323 is connected to ground and whose output 324 is fed back to the negative input 321 via a variable resistor 325. By means of a resistor 326 the output 324 of the operational amplifier 322 is connected to a negative input 331 of an operational amplifier 332, whose positive input is connected to ground via a resistor 333 and whose output 334 is fed back to its negative input 331 via a variable resistor 335. The output 334 of the operational amplifier 332 carries the signal $u_i$ i.e. the computed measurement voltage.

The position-measurement circuit further receives the signal sui from the signal-shaping circuit 1 and a signal rv which indicates the direction of rotation of the motor. These two signals are applied to two inputs 341 and 342 of an EXCLUSIVE-OR gate 343. An output 344 of the EXCLUSIVE-OR gate 343 is connected directly to a first input 351 of a switch 353 and to a second input 354 of the switch 353 via an inverter 353. The positive pole 361 of a voltage source, not shown, is connected to the negative pole 367 of the voltage source via five series-connected resistors 362, 363, 364, 365 and 366. The voltages on the poles 361 and 367 of the voltage source are balanced to ground. The values of the voltages and the resistors 362, 363, 364, 365 and 366 are selected in such a way that a voltage of $+2$ V appears between the resistors 362 and 363 and a voltage of $+200$ mV between the resistors 363 and 364, a voltage of $-200$ mV between the resistors 364 and 365, and a voltage of $-2$ V relative to ground between the resistors 365 and 366. The voltage of $+200$ mV is applied to a third input 371 of the switch 352 and the voltage of $-200$ mV is applied to a fourth input 372 of the switch 352. The switch 352 is controlled by the two inputs 351 and 354, on which the OR-combination of the signal sui and the signal rv appears in inverted form and in non-inverted form respectively. Depending on these signals the switch 352 either transfers the $+200$ mV voltage or the $-200$ mV voltage to its output 373. This is effected in such a way that if the signal sui is high the output 373 carries a voltage of $-200$ mV and if the signal sui is low the output 373 carries a voltage of $+200$ mV. This output 373 of the switch 352 supplies the reference voltage $U_{r1}$. The voltage of $+2$ V relative to ground taken from the junction point between the resistors 362 and 363 is the reference voltage $U_{r3}$ and the voltage of $-2$ V relative to ground taken from the junction point between the resistors 365 and 366 is the reference voltage $U_{r2}$.

The three reference voltages $U_{r1}$, $U_{r2}$, $U_{r3}$ and the measurement voltage $u_i$ are applied to the three comparators 72, 74 and 76 in the same way as in the position-measurement circuit 3 in FIG. 1, whose outputs are connected to one another by logic gates 92, 94, 83 and 102. The output 105 of the gate 102 supplies the signal sd and the output 85 of the gate 83 supplies the comparison signal si.

For example, if the nominal-phase signal is high, the reference voltage $U_{r1}$ is negative. The comparator 76 now compares this reference voltage with the measurement voltage $u_i$. If $u_i < U_{r1}$ the signal si will be high, but if $u_i > U_{r1}$ this signal will be low. The signal sd is always high when the measurement voltage $u_i$ exceeds the reference voltage $U_{r3}$ or is lower than the reference voltage $U_{r2}$.

Figure 4:
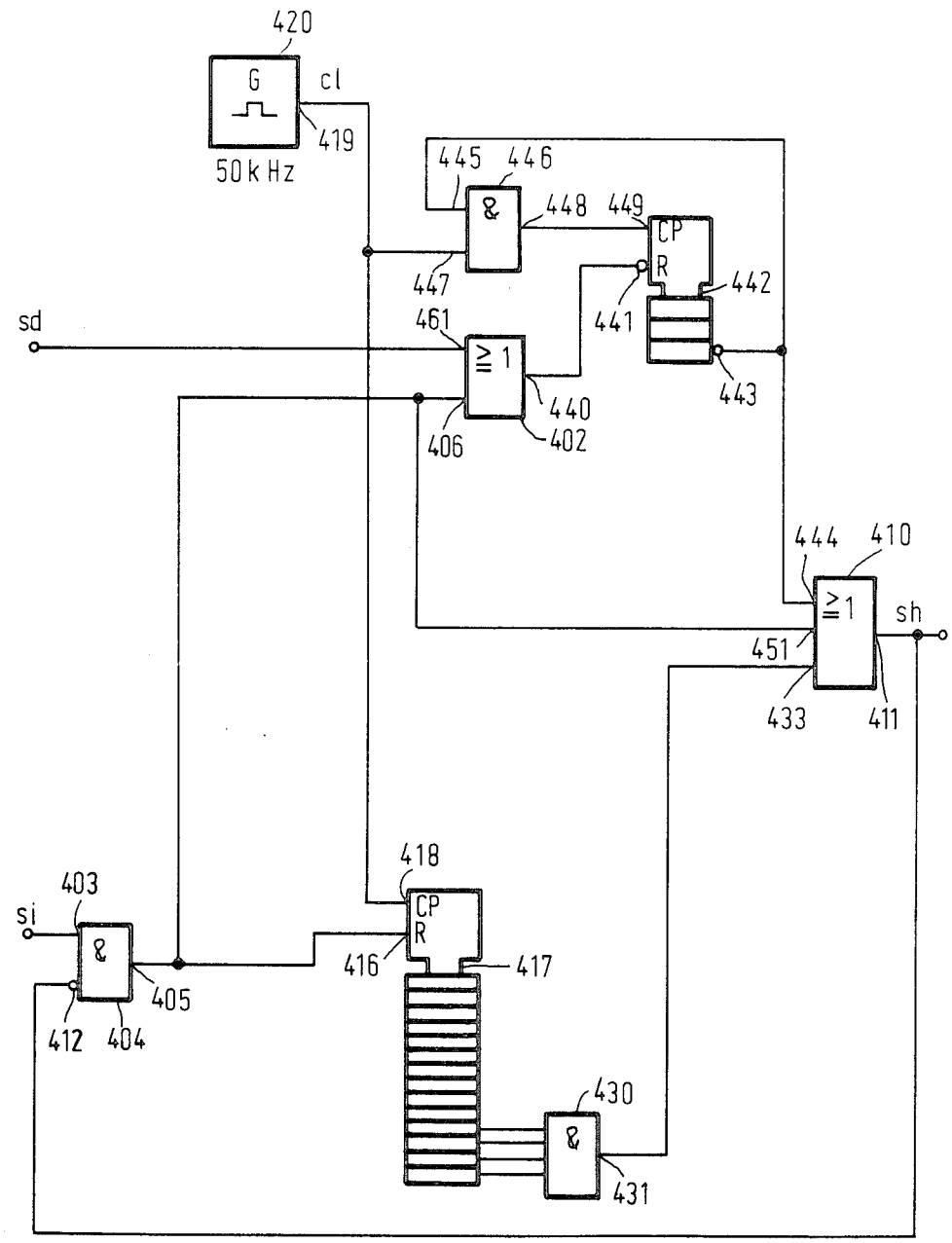
FIG. 4 is the circuit diagram of the delay circuit in the control circuit of FIG. 1.

FIG. 4 is a circuit diagram of the delay circuit 4 as shown in FIG. 1. The signal sd is applied to a first input 461 of an OR gate 402. The signal si is fed to a first input 403 of an AND gate 404 whose output 405 is connected to the second input 406 of the OR gate 402. An OR gate 410 produces the shift signal sh on its output 411. This shift signal sh is applied to the input 13 of the shift register 5 in the control circuit and to an inverting second input 412 of the AND gate 404 in the delay circuit. The output 405 of the AND gate 404 is connected both to the input 406 of the OR gate 402 and to the reset input 416 of a shift register 417. A shift input 418 of the shift register 417 is connected to the output 419 of a square-wave generator 420, whose output signal has a frequency of 50 kHz. The shift register comprises fourteen storage cells arranged one after the other, the outputs of the last four storage cells being connected to four inputs of an AND gate 430. An output 431 of the AND gate 430 is connected to an input 433 of the AND gate 410.

An output 440 of the OR gate 402 is connected to an inverting reset input 441 of a shift register 442 comprising three storage cells in series. An inverting input 443 of the last storage cell is connected to an input 444 of the OR gate 410 and to an input 445 of an AND gate 446. A second input 447 of the AND gate 446 receives the 50 kHz signal from the generator 420. An output 448 of the AND gate 446 is connected to a shift input 449 of the shift register 442. An input 451 of the OR gate 410, whose output 411 supplies the signal sh, is connected to the output 405 of the AND gate 404, whose inputs 403 and 412 receive the signal si and the inverted signal sh.

The delay circuit operates as follows: An (si∧sh) pulse applied to an input 451 of the OR gate 410 resets the shift register 442. This results in a high level on the inverting output 443, which is applied to an input of the OR gate 410 and to the AND gate 446 to enable the shift register 442 to be advanced. This register is now advanced until the storage cell is set again, causing the inverting output to go low. However, during normal operation the shft register is previously reset by an sd pulse. After the sd pulse, once the shift register 422 has been reset, the storage cells in the shift register are set one after the other until a low level appears on the inverting output, so that the output 411 of the OR gate 410 goes low again and the AND gate 446 inhibits the shift register 442. In the normal operating condition the signal sh goes high after every (si∧sh) pulse. The signal sh goes low again in response to the signal sd after a delay determined by the shift register 442.

If the motor operates in this condition, i.e. if the commutation is in phase with the rotor position and sh pulses are generated at regular intervals, the shift register 417 is each time reset by the (si∧sh) pulses. If this does not happen and the last storage cell of the shift register 417 is set, a "one" will appear on the utput 431 of the AND gate 430, i.e. an sh pulse on the output 411 of the OR gate 410. This pulse again resets the shift register 417. This means that if the motor is stationary or has a very low speed, i.e. if no more sh pulses are generated or they appear at very long time intervals from each other, the shift register 417 automatically generates an sh pulse.

Figure 5:
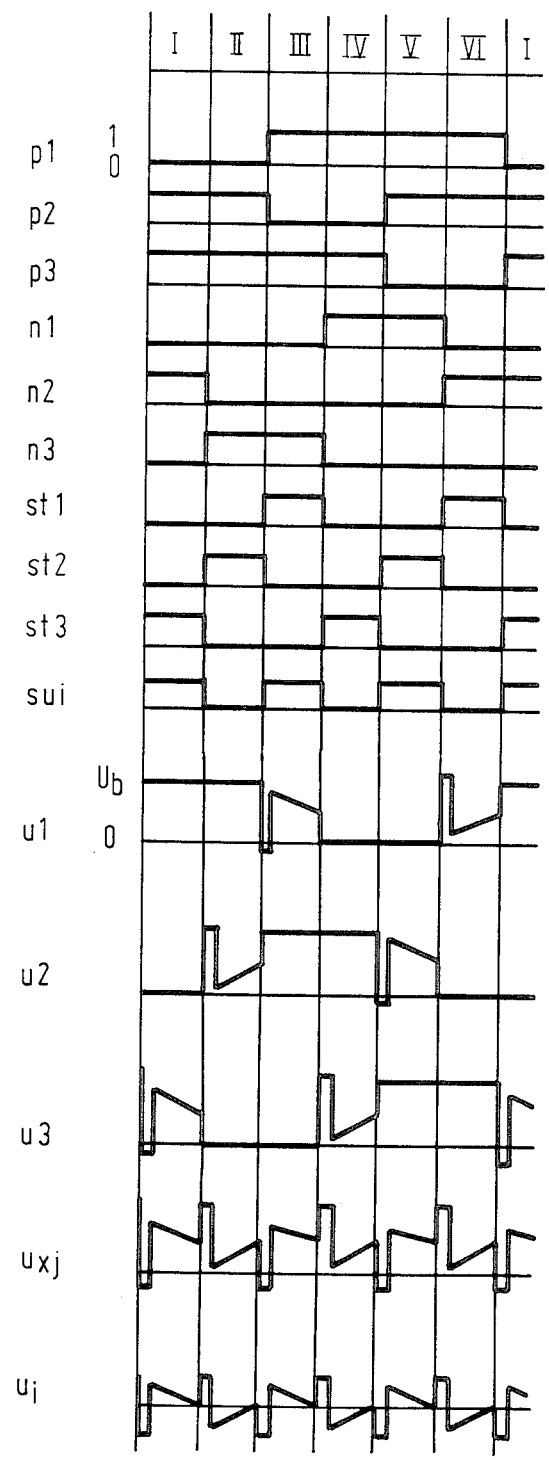
FIG. 5 shows some signal and voltage waveforms occurring in the control circuit.
Figure 6:
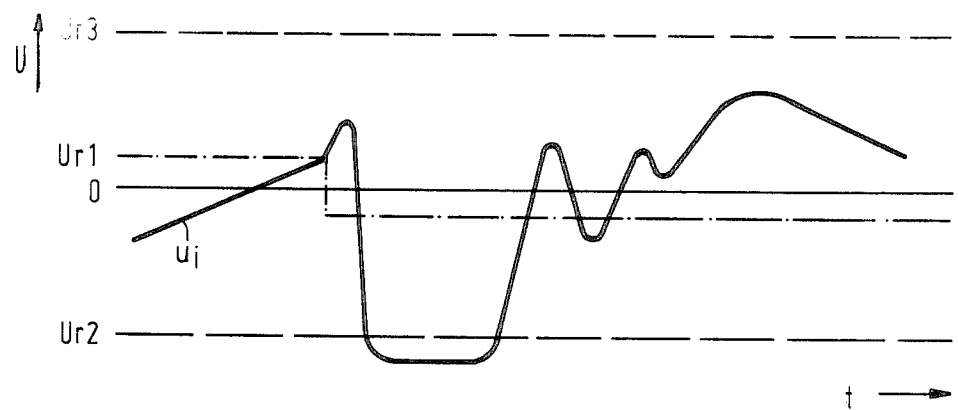
FIG. 6 illustrates a commutation cycle by means of the measurement voltage and some signals and voltages occurring in the control circuit.
Figure 6:
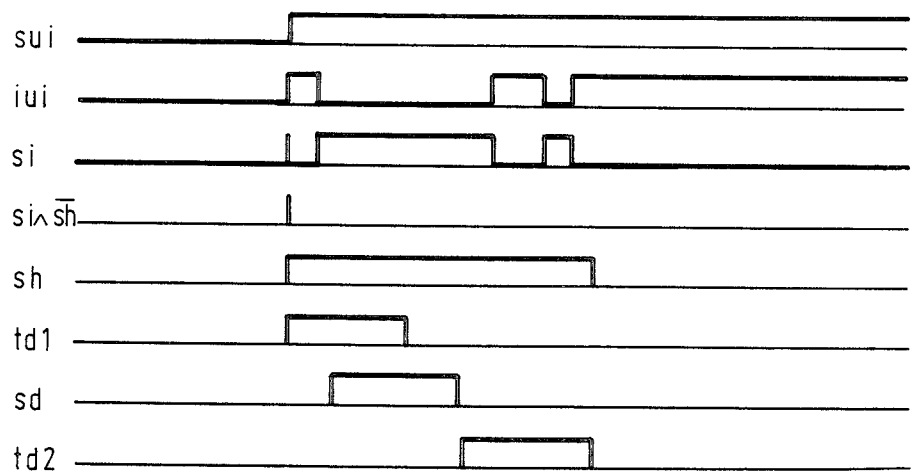
Figure 7:
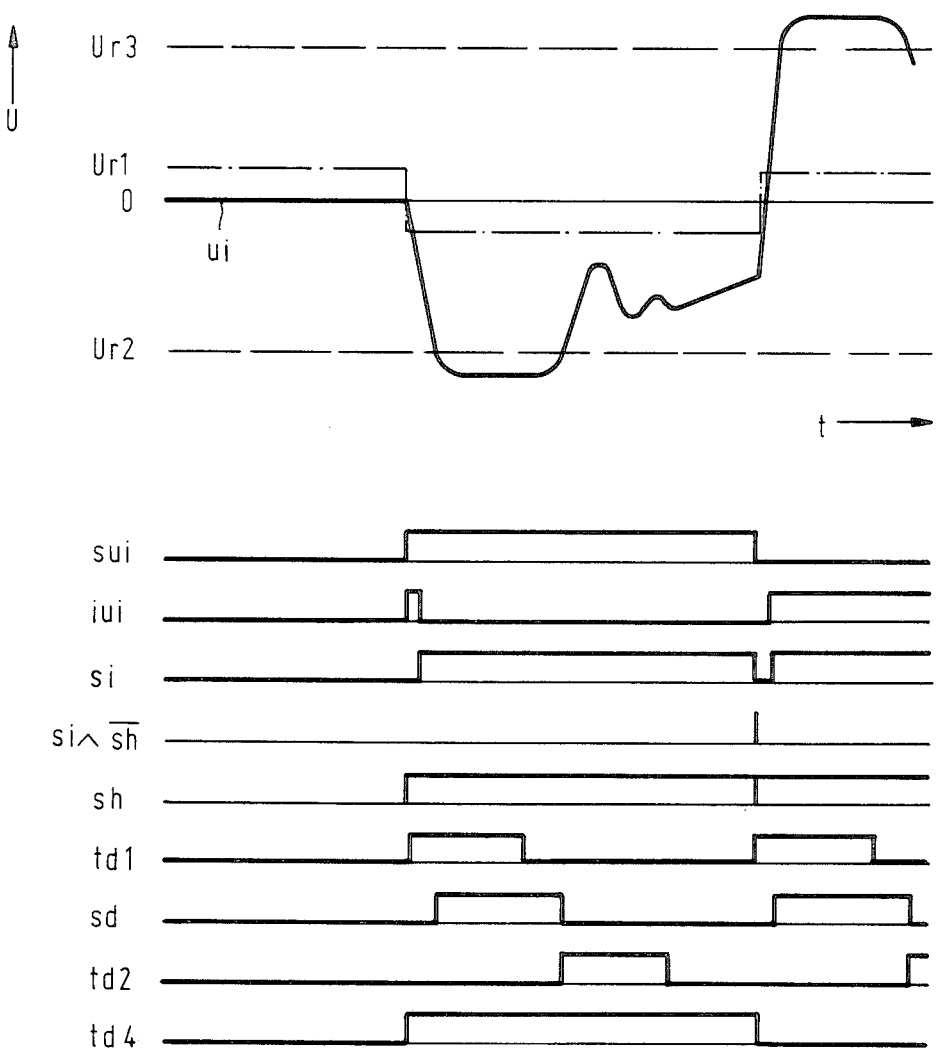
FIG. 7 illustrates a commutation cycle as shown in FIG. 6, but after stoppage of the rotor and with an incorrect commutation state after re-starting.

FIGS. 5, 6 and 7 show some signal and voltage waveforms appearing in the control circuit. The references to the individual elements of the control circuit in the description with reference to FIGS. 5, 6 and 7 relate to the block diagram of the control circuit shown in FIG. 1.

FIG. 5 shows some signal and voltage waveforms in the control circuit for six sub-intervals. The sub-intervals I to VI occur in a cyclic sequence and correspond to the six states of the shift register 13 in the signal-shaping circuit 1. In FIG. 5 the signals p1, p2, p3, n1, n2 and n3 are shown for these six sub-intervals. The signals p1, p2 and p3 connect the winding terminals 21, 31 and 41 to the positive pole of the current source by means of the transistors 25, 35 and 45. During the sub-intervals I and II the signal p1 is low. During these sub-intervals the transistor 25 is turned on, causing the terminal 21 to be connected to the positive pole of the current source. During the intervals III to VI the signal p1 is high, so that the transistor 25 is cut off. Similarly, the signals p2 and p3 cause the terminals 31 and 41 to be connected the current source. During the sub-intervals III and IV the signal p2 is low and during the sub-intervals V and VI the signal p3 is low, so that during these intervals the corresponding terminals are connected to the positive pole of the current source. By means of the transistors 26, 36 and 46 the signals n1, n2 and n3 connect the terminals 21, 31 and 41 to the negative pole of the current source. The transistors 26, 36 and 46 are turned on if the signals n1, n2 and n3 are high. For the signal n1 this is the case during the intervals IV and V, for the signal n2 during the intervals I and VI, and for the signal n3 during the intervals II and III. In the same way as the signals p1 to n3, the signals st1, st2, st3 and sui, which are also shown in the Figure, are derived in the logic circuit 12 of the signal-shaping circuit 1. The signal st1 is always high if the terminal 21 is connected neither to the positive nor to the negative terminal of the current source. This is the case for the signal st1 during the sub-intervals III and VI. The same applies to the signals st2 and st3; the signal st2 is high during the sub-intervals II and V and the signal st3 is high during the sub-intervals I and IV. The signals st1, st2 and st3 thus define the sub-intervals in which transient effects and subsequently induced voltages occur in the relevant windings. The nominal-sign signal sui is always high if transient effects followed by induced voltages occur in one of the three windings connected to the terminals 21, 31, 41 after the relevant terminal has been disconnected from the positive pole of the current source. This is the case during the sub-interval I, II and V.

FIG. 5 also shows the voltage waveforms u1, u2 and u3 appearing on the winding terminals 21, 31 and 41 during the sub-intervals. The winding 21 is connected to the positive pole of the current source during the sub-intervals I and II, in response to the signal p1, which is low during the sub-intervals. During the sub-interval III the signal p1 is high and the signal n1 is low, so that the winding is connected neither to the positive nor to the negative pole of the current source. During this sub-interval a transient effect occurs in the winding during which the voltage temporarily decreases to a value below zero volts. During this time the diode 24 conducts and carries the transient current. Subsequently, this diode 24 is turned off to enable the voltage induced in the winding to be measured. After the transient effect this induced voltage has a positive value and decreases to approximately half this value during the sub-interval III. During the sub-intervals IV and V the winding terminal 21 is connected to the negative pole of the current source in response to the signal n1 which is high during these sub-intervals. In the sub-interval VI a transient effect occurs and subsequently the induced voltage appears. In principle, the voltage waveforms u2 and u3 have the same shape but they are each shifted by two sub-intervals relative to the voltage waveform u1.

Further FIG. 5 shows the signal $u_{xj}$ which appears on the output 62 of the analog multiplexer 58 of the position-measurement circuit 3. This signal $u_{xj}$ comprises exactly the sub-intervals of the three winding voltages u1, u2 and u3 in which transient effects followed by induced voltages occur. The voltage waveform ui which is also shown is said Figure is the measurement voltage appearing on the output 65 of the operational amplifier 64. This measurement voltage has a waveform similar to that of the signal $u_{xj}$ but is symmetrical relative to the zero line.

FIG. 5 shows the idealised waveforms of the voltages u1, u2, u3, $u_{xj}$ and $u_i$ i.e. possible transients causing spurious zero crossings are not shown.

FIG. 6 shows the measurement voltage $u_i$ as appearing, for example, at the end of the sub-interval II and at the beginning of the sub-interval III. The measurement voltage $u_i$ is no longer shown in idealised form; the transient effect is followed by ringing during which the voltage fluctuates about the zero point. Subsequently, the induced voltage stabilises. The signals sui, iui, si (si∧sh) (output of the AND register 119 of the delay circuit 4), sh, $t_{dl}$, sd and $t_{d2}$ are shown in FIG. 5 during the same time interval as the signal $u_i$. The signals represent a commutation cycle as occurs, for example, in the transition between the sub-intervals II and III during normal operation of the motor, i.e. when the rotor and the commutation are in phase with each other. The diagram of the measurement voltage $u_i$ also shows the reference voltages $U_{r1}$, $U_{r2}$ and $U_3$. The low reference voltage $U_{r1}$ is positive if the nominal-phase signals sui is low and it is negative if the signal sui is high. The signal $U_i$ is first negative and subsequently positive but smaller than $U_{r1}$. During these time intervals the signal iui is low. As soon as the measurement $u_i$ exceeds the signal $u_{r1}$ the signal iui goes high. Since at this instant sui is still low because the commutation has not yet been advanced, the signal si becomes high, because the sign of the measurement voltage ui does not correspond to the sign given by the nominal-phase signal sui. When the signal $s_i$ goes high the delay circuit 4 generates an sh pulse. This sh pulse advances the shift register 13. In its turn this results in the signal sui going high. Since the measurement voltage now has the sign given by the nominal-phase signal sui, the signal si goes low again. However, during the subsequent transient effect the measurement voltage decreases below the reference voltage $U_{r1}$, so that the signal iui again goes low and the signal si again goes high. During the ringing effects following the transient and the resulting spurious zero crossings the level of the two signals changes several times. During the entire time interval in which the transient effect and the subsequent spurious zero crossings occur, the shift signal sh is maintained high. Only after the signal sh has become low again a new commutation can be effected when the signal si changes from low to high. Thus, the width of the signal sh is selected in such a way that it is always high during the transient effects and possible spurious zero crossings. The width of the shift pulse sh is determined by the width of the pulses supplied by the pulse shapers 110 and 122. The pulse shaper 122 supplies a pulse of the width td1 after the signal si has changed from low to high. The pulse shaper 110 supplies a pulse of the width $t_{d2}$ after the signal sd has changed from high to low. The signals sd is always high when the measurement voltage is smaller than the reference voltage $U_{r2}$ or exceeds the reference voltage $U_{r3}$. In the example shown in FIG. 6 the measurement voltage becomes smaller than the reference voltage $U_{r2}$ during the transient effect. After termination of the pulse $t_{d2}$ the pulse sh goes low. The next commutation is now started once the sign of the measurement voltage $u_i$ obtained by comparison with the reference voltage $U_{r1}$ and the sign indicated by the nominal-sign signal sui no longer correspond, i.e. as soon as the signal si goes high again. In the example shown in FIG. 6 the measurement voltage has the correct sign after the pulse sh has gone low again, i.e. the rotor has a correct position for the given commutation state. The next commutation is started when the measurement voltage becomes smaller than the reference voltage $U_{r1}$, which is now negative, but this is not illustrated in the Figure.

This means that the measurement voltage $u_i$ is employed as a criterion for the correct commutation only during those time intervals in which no transient effects or spurious zero crossings before or after the transient effects occur.

The diagram in FIG. 7 shows the same voltage and signal waveforms as in FIG. 5, but it is now assumed that the motor is initially stationary and after starting the rotor is in a position which is not in conformity with the instantaneous commutation state.

As the rotor is stationary, no voltage is induced in the rotor windings. This means that initially the measurement voltage is zero. Consequently, the signal si does not produce a commutation. Should this be the case during a time interval $t_{d3}$ the delay circuit will generate a pulse of the width $t_{d4}$, which is also shown in FIG. 7. This pulse gives rise to a pulse sh, i.e. the commutation of the motor is advanced one step. In the present example the signal sui now changes from low to high. The transient effect following the commutation step results in the measurement voltage $u_i$ initially being slightly higher than $U_{r1}$, but subsequently it becomes smaller than $U_{r1}$ and then also smaller than $U_{r2}$. Consequently, shortly after commutation the signal iui goes briefly high and subsequently goes low again. During the intervals in which the signal iui is low the signal si goes high, because the nominal-sign signal sui indicates a positive sign, which is the actual sign of the voltage but which is negative compared with the reference voltage $U_{r1}$. The transition from low to high of the shift pulse sh results in a pulse $t_{d1}$ being generated. During the time interval in which the measurement voltae $u_i$ is smaller than the reference voltage $U_{r2}$ an sd pulse is generated whose transition from low to high supplies a pulse of the width $t_{d2}$. However, the width of the pulse $t_{d4}$, which has started the commutation, is selected in such a way that in anycase its transition from high to low occurs after the $t_{d2}$ pulse. If the pulse $t_{d4}$ now again changes from high to low and the sh pulse does the same, the signs of the signals sui and iui are compared again. In the present example the fictitious star voltage is smaller than the reference voltage $U_{r1}$. The sign defined by the signal sui, however, is positive (sui is high). This means that the signal si is high when sh goes from high to low. Consequently, a pulse is generated on the output 121 of the gate 119 in the delay circuit 4. This pulse (logic siΛsh) immediately initiates new sh pulse. Consequently, the commutation immediately advances one step. Subsequently, it is ascertained (which is not shown in FIG. 7) after every sh pulse whether the fictitious star voltage has the sign defined by the nominal-phase signal sui. If this is not the case the next sh pulse and, consequently, the next commutation step is initiated. This is repeated until the measurement voltage has the correct sign, i.e. until the communtation state of the stator windings is in conformity with the instantaneous rotor position. Once this is achieved commutation proceeds in the same way as in the example of FIG. 6.

Figure 8:
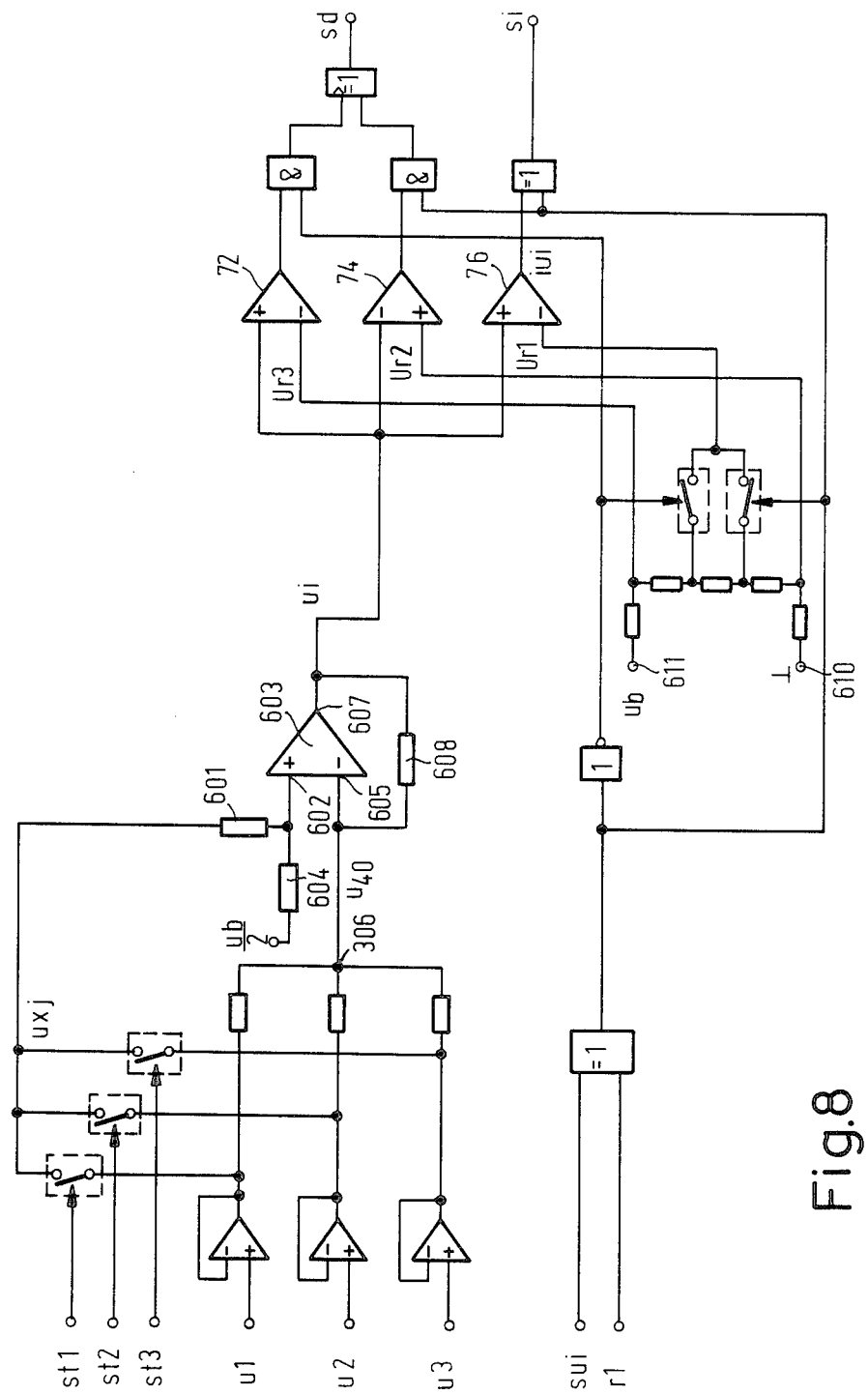
FIG. 8 is a circuit diagram of a modification of the position-measurement circuit shown in FIG. 3.

FIG. 8 is the circuit diagram of a modification of the position-measurement circuit shown in FIG. 3. This circuit does not require the use of a voltage source supplying two voltages which are balanced to ground. In this modified circuit the signal uxj and the computed star point voltage $u_{40}$ appearing on the junction point 306 are obtained in the same way as in the circuit shown in FIG. 3. The signal uxj is applied to a positive input 602 of a compuarator 601 via a resistor 601. Further, this input 602 is connected to a point carrying voltage $U_{b/2}$ via a resistor 604. The resistors 601 and 604 should have the same resistance values. A negative input 605 of the comparator 603 is connected to the junction point 607 on which the computed star voltage $u_{40}$ appears. An output 607 of the comparator 603 is connected to its negative input 605 via a resistor 608. This resistor 608 should have one third of the resistance value of the resistors 307, 308. The measurement voltage $U_i$ is applied to the output 607 of the operational amplifier 603. Further, the comparators 72 to 76 and the output gates are arranged in the same way as in the circuit shown in FIG. 3. Similarly, the processing of the signals sui and rv, and the arrangement of the voltage source and of the switch 352 are the same as in the circuit shown in FIG.

3. The only difference is that the resistor 366 is connected to an ground terminal 610 of a voltage source and the resistor 362 is connected to the positive pole 311 of the same voltage source. This positive voltage has a value $U_b$ and is consequently twice as high as the voltage on the point to which the resistor 604 is connected.

As already stated, the difference between the circuit shown in FIG. 8 and that in FIG. 3 is that the circuit shown in FIG. 8 does not require the use of a voltage source which generates two voltages which are balanced to ground. For this reason the measurement voltage $u_f$ applied to the comparators 72 to 76 in the circuit shown in FIG. 8 is raised by the direct voltage $U_{b/2}$ as compared with the measurement voltage in FIG. 3. The direct voltages applied to the comparators 72 to 76 are shifted by the same direct voltage value.

Figure 9:
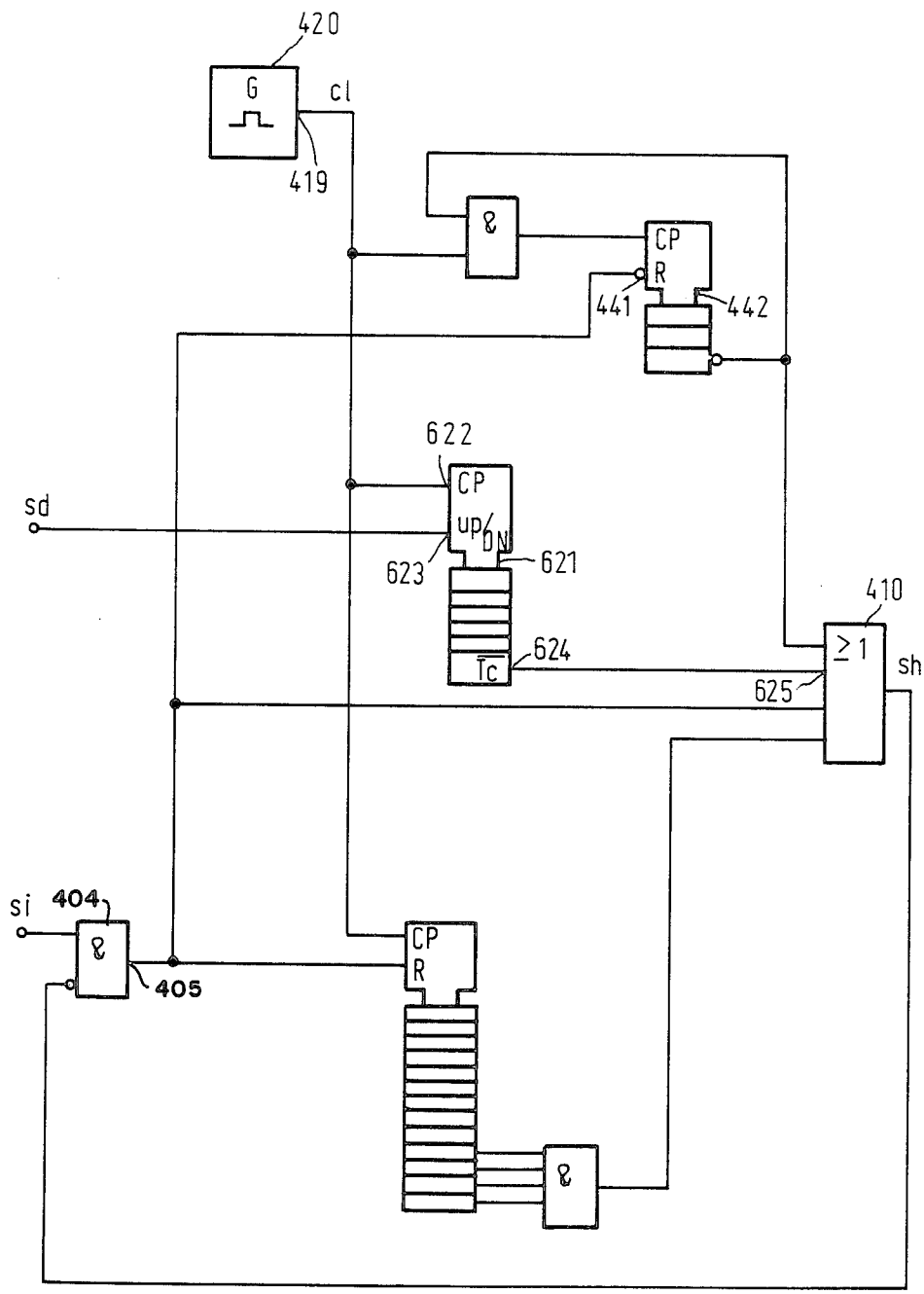
FIG. 9 is the circuit diagram of a modification of the delay circuit shown in FIG. 4.

FIG. 9 shows a modification of the delay circuit of FIG. 4. In this modification the time during which the comparison signal is inhibited after every transient effect depends on the duration of the transient effect, i.e. of the signal sd. The circuit shown in FIG. 9 differs from that in FIG. 4 in that there is provided an additional counter 621 whose clock input is connected to the output 419 of the generator 420. A further input 623 of the counter 621 is connected to a point carrying the signal sd. The counter is changed over via this input 623, i.e. depending on the level of the signal sd the counter 621 counts up or counts down. A carry output 624 of the counter 621 is connected to an additional input 625 of the OR gate 410. The reset input 441 of the counter 442 is connected directly to the output 405 of the AND gate 404, so that the counter 442 is no longer reset by a pulse of the sd signal. Thus, in this modified circuit after every (si∧sh) pulse the signal sh first goes high and then goes low if the counter 621 has counted down to zero after the sd signal has failed to occur. The delay after which the signal sh goes low again consequently depends on the length of the sd pulse, because the counter 621 has counted up depending on the length of the sd pulse and requires the same time to count down again when signal sd fails to occur.

What is claimed is:

1. A control circuit for a collectorless d.c. motor comprising a permanent-magnet rotor having one or more pole pairs and a stator with at least two primary windings forming a multiphase system, the control circuit comprising: electronic switching elements for selectively connecting each phase, depending on voltages induced in the windings by the permanent-magnet field of the rotor, to a negative and positive pole of a direct current source to perform commutation steps in accordance with the commutation state,
    means for deriving a comparison signal which indicates whether the sign of that winding voltage which is not connected to the direct current source by means of the electronic switching elements corresponds to a given sign which depends on the instantaneous commutation state, and
    means for inhibiting the comparison signal in those intervals in which transient effects occur in the windings which may produce spurious zero crossings as a result of the electronic switching elements being turned off, and
    means controlled by the comparison signal for switching the electronic switching elements one commutation step further if the comparison signal indicates a mismatch between said winding voltage sign and said given sign.

2. A control circuit as claimed in claim 1, wherein the motor stator includes at least three windings connected in a star configuration, the control circuit comprising:
    means for computing a measurement voltage by subtraction of a star-point voltage from a signal indicative of those intervals of the winding voltages in which the windings are not connected to the direct current source,
    means for generating a nominal-phase signal which defines the appropriate nominal sign of the measurement voltage for the instantaneous commutation state of the motor,
    said deriving means generating said comparison signal which indicates whether the sign of the measurement voltage and the sign defined by the nominal-phase signal are the same,
    said inhibiting means being operative to inhibit the comparison signal for a given length of time during those intervals in which the transient effects which may produce spurious zero crossings can occur in the windings as a result of the electronic switching elements being turned off, and wherein
    the electronic switching elements are advanced one commutation step in response to the comparison signal for different signs of the measurement voltage and the nominal sign defined by the nominal-phase signal.

3. A control circuit as claimed in claim 2, characterized in that the means for computing the measurement voltage includes an analog multiplexer and an analog computing circuit.

4. A control circuit as claimed in claim 2 wherein said switching means comprise a shift register which can cycle through six positions whereby the states of the electronic switching elements and the nominal-phase signal are determined by binary output signals of the shift register and which is advanced by means of a shift signal generated either by the comparison signal or each time that the switching elements have not been actuated by the comparison signal for a predetermined time interval.

5. A control circuit as claimed in claim 2 wherein the inhibiting means inhibits the comparison signal during time intervals in which the measurement voltage exceeds a predetermined positive voltage or decreases below a predetermined negative voltage.

6. A control circuit as claimed in claim 2 wherein in order to eliminate spurious zero crossings, the inhibiting means inhibits the comparison signal (si) for a predetermined time after every switching operation of the electronic switching elements and for a predetermined time after every transient effect.

7. A control circuit as claimed in claim 6 wherein the inhibiting means inhibits the comparison signal after every transient effect for a predetermined time that depends on the duration of the transient effect.

8. A commutation circuit for a collectorless DC-motor comprising a permanent magnetic rotor having one or more pole pairs and a stator with at least two stator windings forming a multiphase system, the commutation circuit comprising: electronic switching elements for connecting the stator windings to first and second poles of a DC-source, means for indicating the present commutation state in a cycle of sequential commutation states, means for deriving from the indicated commutation state switching signals for controlling the electronic switching elements in accordance with the indicated commutation state, means for selecting a winding which is disconnected from the DC-source during the indicated commutation state in dependence on the indicated commutation state, said means for deriving producing, from the indicated commutation state, a nominal phase signal defining the appropriate sign of the voltage induced in the selected winding during the indicated commutation state, means for comparing the sign defined by the nominal phase signal with the actual sign of a voltage in the selected winding and generating a comparison signal when a mismatch occurs between the actual sign and the sign defined by the nominal phase signal, means for switching the commutation state indicating means to the next commutation state in the cycle, in response to the comparison signal, when a mismatch is indicated, and means for inhibiting the switching of the commutation state indicating means during intervals in which winding transient effects may give rise to spurious zero crossings of the voltage induced in the selected winding.

9. A commutation circuit as claimed in claim 8 wherein the motor stator includes at least three windings connected to form a multiphase star-system, the circuit comprising means for determining the value of the star-point voltage and means for determining the value of the voltage at the disconnected terminal of the selected stator winding, and means for substracting the star-point voltage and the voltage at the disconnected terminal from one another in order to obtain a signal voltage indicative of the voltage induced in the selected stator winding.

10. A commutation circuit as claimed in claim 9, characterized in that the electronic switching elements are switched one additional commutation step further if the switching elements have not been advanced by the comparison signal for a predetermined time interval.

11. A commutation circuit as claimed in claim 10, characterized in that the commutation state indicating means comprise a shift register which can cycle through six positions and the states of the electronic switching elements and the nominal phase signal are determined by binary output signals of the shift register which is advanced by means of a shift signal generated either by the comparison signal or each time that the switching elements have not been advanced by the comparison signal for a predetermined time interval.

12. A commutation circuit as claimed in claim 9, characterized in that the inhibiting means inhibits the comparison signal during time intervals in which the signal voltage exceeds a predetermined positive voltage or decreases below a predetermined negative voltage.

13. A commutation circuit as claimed in claim 12, characterized in that in order to eliminate spurious zero crossings, the inhibiting means inhibits the comparison signal additionally for a predetermined time after every switching operation of the electronic switching elements and for a predetermined time after every transient effect.

14. A commutation circuit as claimed in claim 13, characterized in that the inhibiting means inhibits the comparison signal after every transient effect for a predetermined time interval that depends on the duration of the transient effect.

15. A commutation circuit as claimed in claim 9, characterized in that during the generation of the comparison signal a comparator determines the sign of the signal voltage depending on whether the signal voltage exceeds or decreases below a small predetermined voltage whose sign is opposite to the sign of the signal voltage as indicated by the nominal-phase signal.

16. A commutation circuit as claimed in claim 9 wherein the signal voltage is determined by means of an analog multiplexer and an analog computing circuit.

* * * * *